Oct. 16, 1934. W. SPENCER 1,977,021
ROOT FENCE FOR FLOWER BEDS AND THE LIKE
Filed Jan. 26, 1934
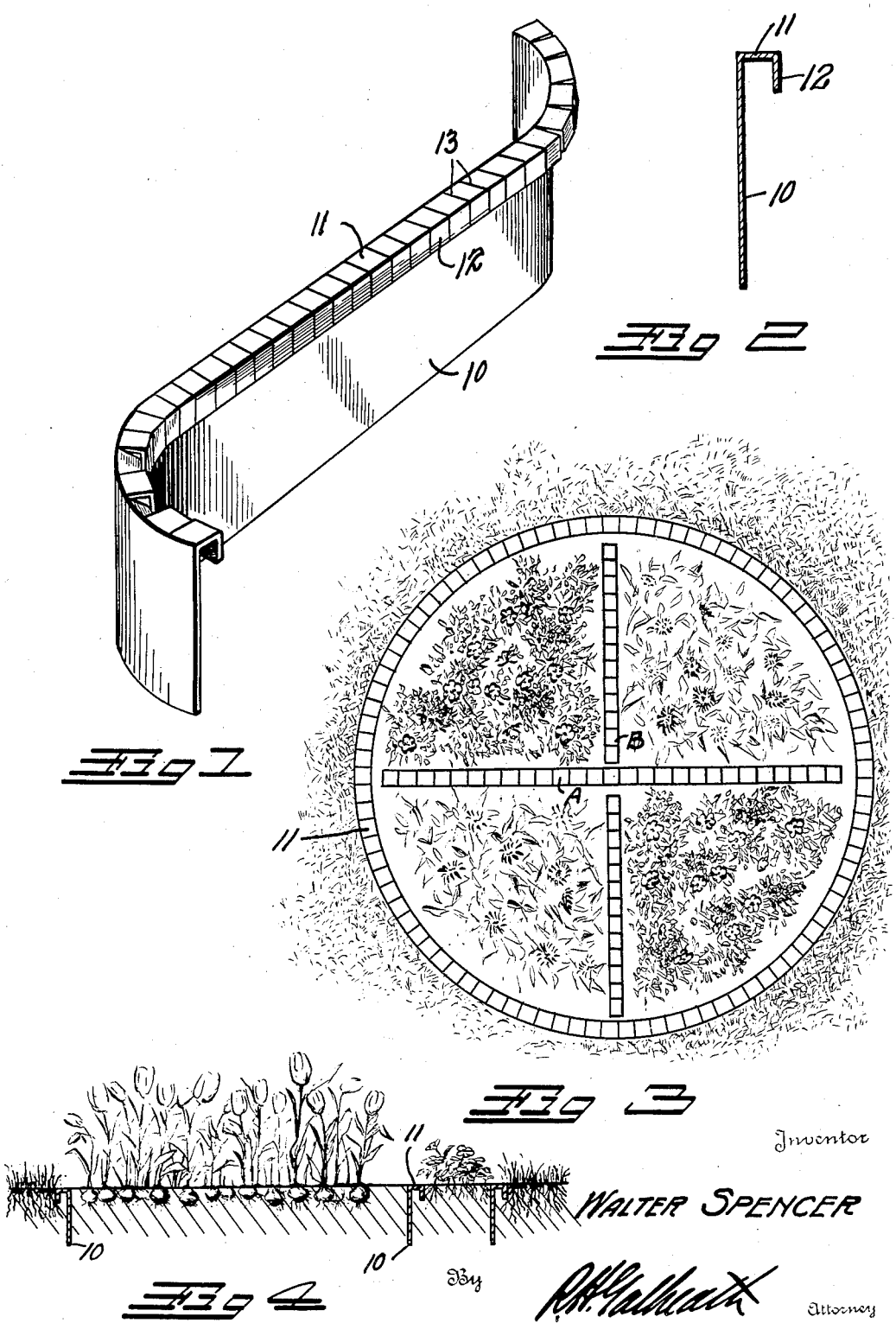

UNITED STATES PATENT OFFICE 1,977,021

ROOT FENCE FOR FLOWER BEDS AND THE LIKE

Walter Spencer, Denver, Colo.

Application January 26, 1934, Serial No. 708,385

1 Claim. (Cl. 47—33)

It is extremely difficult to prevent grass and similar growths from encroaching upon cleared spaces such as flower beds, tree and bush borders, walks, driveways, etc. This invention relates to a device designed to prevent this encroachment by preventing expansion or migration of the plant roots below the ground surface.

The principal object of the invention is to provide a device of this character which can be shaped or formed into any desired design to conform to roadways, flower beds, tree and bush borders, etc., and which will not sink below the surface of the ground, but will remain flush with the surface thereof.

Other objects and advantages reside in the detail construction of the invention, which is designed for simplicity, economy, and efficiency. These will become more apparent from the following description.

In the following detailed description of the invention reference is had to the accompanying drawing which forms a part hereof. Like numerals refer to like parts in all views of the drawing and throughout the description.

In the drawing:—

Fig. 1 is a perspective view of a short section of the device.

Fig. 2 is a vertical cross section therethrough.

Fig. 3 is a plan view of a typical flower bed in which the device is used.

Fig. 4 is a section through a typical flower bed illustrating the device in use.

The invention comprises a flexible strip 10 of sheet metal, either of a non-corrosive type or plated or galvanized to prevent corrosion. The upper longitudinal edge of the strip 10 is turned first at right angles to the body of the strip to provide a horizontal flange 11, thence downwardly to provide a vertical flange 12. The turned portion of the strip is laterally slotted, as shown at 13 so that these flanges consist of a series of sections.

The sectional character of the flanges allows the strip to be flexed to small diameters or turned at sharp corners to suit any desired landscape feature. If the strip is turned backwardly upon itself as shown in the upper portion of Fig. 1, the flange sections will separate from each other. If turned forwardly on itself as shown in the lower portion of Fig. 1, certain sections of the flange will over-lie the adjacent sections to allow an inward turn to be made.

The device is preferably furnished in long strips which can be cut to any suitable length. Should additional length be desired, the strips can be overlapped at their extremities, with the interlocking flange portions holding the joint in alignment.

In use, the lower edge of the strip is forced into the ground, preferably until the horizontal flange 11 lies flush with the surface thereof, as shown in Fig. 4. This prevents grass and plant roots from traveling past the barrier provided by the device and permanently maintains a sharp clean lawn edge. It can also be used to divide various portions of a flower bed, as shown at A and B, Fig. 3, so as to enhance and preserve the formal architectural effect thereof.

The flange portion of the device overlaps the ground and prevents it being forced below the surface. The strip 10 may be made in any desired width depending upon the root depth of the growths it is desired to separate.

While a specific form of the improvement has been described and illustrated herein, it is desired to be understood that the same may be varied, within the scope of the appended claim, without departing from the spirit of the invention.

Having thus described the invention, what is claimed and desired secured by Letters Patent is:—

A device for preserving the borders of lawns etc. comprising: a relatively long strip of flexible sheet metal; an inwardly turned horizontal flange along the upper edge of said strip; a downwardly turned flange along the edge of said inwardly turned flange, said flanges being laterally separated at spaced apart positions throughout their lengths so as to form a series of flange sections which may separate or overlap as said strip is bent.

WALTER SPENCER.